United States Patent
Nie et al.

(10) Patent No.: US 12,282,314 B2
(45) Date of Patent: Apr. 22, 2025

(54) HYPERGRAPH SEARCH FOR REAL-TIME MULTI-ROBOT TASK ALLOCATION IN A SMART FACTORY

(71) Applicant: University of South Florida, Tampa, FL (US)

(72) Inventors: Zixiang Nie, Tampa, FL (US); Kwang-Cheng Chen, Tampa, FL (US)

(73) Assignee: University of South Florida, Tampa, FL (US)

( * ) Notice: Subject to any disclaimer, the term of this patent is extended or adjusted under 35 U.S.C. 154(b) by 459 days.

(21) Appl. No.: 17/587,532

(22) Filed: Jan. 28, 2022

(65) Prior Publication Data
US 2022/0253048 A1 Aug. 11, 2022

Related U.S. Application Data

(60) Provisional application No. 63/143,978, filed on Feb. 1, 2021.

(51) Int. Cl.
*G05B 19/418* (2006.01)
*G06N 5/01* (2023.01)

(52) U.S. Cl.
CPC . *G05B 19/41865* (2013.01); *G05B 19/41895* (2013.01); *G06N 5/01* (2023.01)

(58) Field of Classification Search
CPC ........ G05B 19/41865; G05B 19/41895; G06N 20/00; G06N 3/006; G06N 3/045;
(Continued)

(56) References Cited

U.S. PATENT DOCUMENTS

| | | | |
|---|---|---|---|
| 9,008,839 B1 | 4/2015 | Kuffner et al. | |
| 10,331,644 B2 * | 6/2019 | Smart | G06F 16/2264 |

(Continued)

FOREIGN PATENT DOCUMENTS

| | | | | |
|---|---|---|---|---|
| CN | 101945492 A | | 1/2011 | |
| CN | 105069530 B | | 2/2019 | |
| CN | 111258316 A | * | 6/2020 | G05D 1/0214 |

OTHER PUBLICATIONS

Bampas, E., Das, S., Dereniowski, D. and Karousatou, C.. Collaborative delivery by energy-sharing low-power mobile robots. In Algorithms for Sensor Systems: 13th International Symposium on Algorithms and Experiments for Wireless Sensor Networks, ALGOSENSORS 2017, Vienna, Austria, Sep. 2017. (Year: 2017).*

(Continued)

*Primary Examiner* — Alicia M. Choi
(74) *Attorney, Agent, or Firm* — Meunier Carlin & Curfman LLC

(57) ABSTRACT

Task assignment for multi-robot systems (MRSs) in a smart factory (Industry 4.0) is described. Aspects are directed to a hypergraph based MRS and production model facilitating the cooperation among robots and serving frequent reconfiguration desired in Industry 4.0. Aspects are directed to a time complexity friendly search algorithm for real-time application using a hypergraph model to get task assignment(s). Parameters are provided for a tradeoff between solution optimality and time complexity. In an implementation, an example system can include a MRS including robots, wherein the MRS is configured to perform a manufacturing task, and a computing device configure to perform a multi-robot task allocation (MRTA) for the MRS. In an implementation, an example method can include generating task assignments, using MRTA, for robots of a MRS including the robots, wherein the MRS is configured (Continued)

to perform a manufacturing task, and providing the task assignments to the MRS.

15 Claims, 9 Drawing Sheets

(58) Field of Classification Search
CPC ......... G06N 5/01; G05D 1/0088; B25J 9/161; G06Q 10/0631
See application file for complete search history.

(56) References Cited

U.S. PATENT DOCUMENTS

| | | | |
|---|---|---|---|
| 10,525,591 B1 | 1/2020 | Baroudi et al. | |
| 11,119,496 B1* | 9/2021 | Ebrahimi Afrouzi | ........................ G05D 1/0274 |
| 2010/0223087 A1* | 9/2010 | Durr | ................ G05B 19/41865 705/7.11 |
| 2010/0241248 A1* | 9/2010 | Zhang | .............. G05B 19/41885 700/29 |
| 2021/0326652 A1* | 10/2021 | Hazard | .................. G06N 5/045 |
| 2022/0179882 A1* | 6/2022 | Cervantes | .............. G06N 5/025 |
| 2022/0197259 A1* | 6/2022 | Poisson | ............ G05B 19/41865 |

OTHER PUBLICATIONS

Wong, A.K., 1987. Knowledge representation for robot vision and path planning using attributed graphs and hypergraphs. In Machine Intelligence and Knowledge Engineering for Robotic Applications (pp. 113-143). (Year: 1987).*
Liu, L. and Shell, D.A., 2012. Large-scale multi-robot task allocation via dynamic partitioning and distribution. Autonomous Robots, 33, pp. 291-307. (Year: 2012).*
Ozdal, M.M. and Aykanat, C., 2004. Hypergraph models and algorithms for data-pattern-based clustering. Data Mining and Knowledge Discovery, 9, pp. 29-57. (Year: 2004).*
Wong, A.K., 1987. Knowledge representation for robot vision and path planning using attributed graphs and hypergraphs. In Machine Intelligence and Knowledge Engineering for Robotic Applications (pp. 113-143). Berlin, Heidelberg: Springer Berlin Heidelberg. (Year: 1987).*
Magri, L. and Fusiello, A., 2017. Multiple structure recovery via robust preference analysis. Image and Vision Computing, 67, pp. 1-15. (Year: 2017).*
Fayek, R.E. and Wong, A.K., Apr. 1996, Using hypergraph knowledge representation for natural terrain robot navigation and path planning. In Proceedings of IEEE International Conference on Robotics and Automation (vol. 4, pp. 3625-3630). IEEE. (Year: 1996).*
Zaidi, L., Sahnoun, M.H. and Bettayeb, B., 2019. Task allocation based on shared resource constraint for multi-robot systems in manufacturing industry. IFAC-PapersOnLine, 52(13), pp. 2020-2025. (Year: 2019).*
Huang, Yin, Yi Zhang, and Hong Xiao. "Multi-robot system task allocation mechanism for smart factory." 2019 IEEE 8th Joint International Information Technology and Artificial Intelligence Conference (ITAIC). IEEE, 2019. pp. 587-591.
Sung, Cynthia, Nora Ayanian, and Daniela Rus. "Improving the performance of multi-robot systems by task switching." 2013 IEEE International Conference on Robotics and Automation. IEEE, 2013.
S. Wang, J. Wan, D. Li, and C. Zhang, "Implementing smart factory of industrie 4.0: an outlook," International journal of distributed sensor networks, vol. 12, No. 1, p. 3159805, 2016.
H. Lasi, P. Fettke, H.-G. Kemper, T. Feld, and M. Hoffmann, "Industry 4.0," Business & information systems engineering, vol. 6, No. 4, pp. 239-242, 2014.
J. R. Duflou, J. W. Sutherland, D. Dornfeld, C. Herrmann, J. Jeswiet, S. Kara, M. Hauschild, and K. Kellens, "Towards energy and resource efficient manufacturing: A processes and systems approach," CIRP annals, vol. 61, No. 2, pp. 587-609, 2012.
J. Wan, B. Chen, S. Wang, M. Xia, D. Li, and C. Liu, "Fog computing for energy-aware load balancing and scheduling in smart factory," IEEE Transactions on Industrial Informatics, vol. 14, No. 10, pp. 4548-4556, 2018.
T. Stock and G. Seliger, "Opportunities of sustainable manufacturing in industry 4.0," Procedia Cirp, vol. 40, pp. 536-541, 2016.
M. Ghobakhloo, "Industry 4.0, digitization, and opportunities for sustainability," Journal of Cleaner Production, vol. 252, p. 119869, 2020.
K.-D. Thoben, S. Wiesner, and T. Wuest, "industrie 4.0 and smart manufacturing—a review of research issues and application examples," International journal of automation technology, vol. 11, No. 1, pp. 4-16, 2017.
S. Wang, J. Wan, D. Zhang, D. Li, and C. Zhang, "Towards smart factory for industry 4.0: a self-organized multi-agent system with big data based feedback and coordination," Computer Networks, vol. 101, pp. 158-168, 2016.
Z. Jakovljevic, V. Lesi, S. Mitrovic, and M. Pajic, "Distributing sequential control for manufacturing automation systems," IEEE Transactions on Control Systems Technology, 2019.
K.-C. Chen, S.-C. Lin, J.-H. Hsiao, C.-H. Liu, A. F. Molisch, and G. P. Fettweis, "Wireless networked multirobot systems in smart factories," Proceedings of the IEEE, vol. 109, No. 4, pp. 468-494, 2021.
G. Fortino, F. Messina, D. Rosaci, G. M. L. Sarn'e, and C. Savaglio, "A trust-based team formation framework for mobile intelligence in smart factories," IEEE Transactions on Industrial Informatics, vol. 16, No. 9, pp. 6133-6142, 2020.
Y. Rizk, M. Awad, and E. W. Tunstel, "Cooperative heterogeneous multirobot systems: a survey," ACM Computing Surveys (CSUR), vol. 52, No. 2, pp. 1-31, 2019.
D. Herrero-Perez and H. Martinez-Barbera, "Modeling distributed transportation systems composed of flexible automated guided vehicles in flexible manufacturing systems," IEEE Transactions on Industrial Informatics, vol. 6, No. 2, pp. 166-180, 2010.
K.-C. Chen, Y. Wang, Z. Nie, and Q. Cui, "Toward holistic integration of computing and wireless networking," in IFIP International Internet of Things Conference. Springer, 2019, pp. 219-234.
J.-H. Hsiao and K.-C. Chen, "Network analysis of collaborative cyberphysical multi-agent smart manufacturing systems," in 2019 IEEE/CIC International Conference on Communications in China (ICCC). IEEE, 2019, pp. 219-224.
P. Lade, R. Ghosh, and S. Srinivasan, "Manufacturing analytics and industrial internet of things," IEEE Intelligent Systems, vol. 32, No. 3, pp. 74-79, 2017.
J. Wan, B. Chen, M. Imran, F. Tao, D. Li, C. Liu, and S. Ahmad, "Toward dynamic resources management for iot-based manufacturing," IEEE Communications Magazine, vol. 56, No. 2, pp. 52-59, 2018.
J. Wan, X. Li, H. N. Dai, A. Kusiak, M. Mart'nez-Garc'ia, and D. Li, "Artificial-intelligence-driven customized manufacturing factory: Key technologies, applications, and challenges," Proceedings of the IEEE, vol. 109, No. 4, pp. 377-398, 2021.
Y. Liu and X. Xu, "Industry 4.0 and cloud manufacturing: A comparative analysis," Journal of Manufacturing Science and Engineering, vol. 139, No. 3, 2017.
K. E. Booth, G. Nejat, and J. C. Beck, "A constraint programming approach to multi-robot task allocation and scheduling in retirement homes," in International conference on principles and practice of constraint programming. Springer, 2016, pp. 539-555.
A. Dutta, E. Czarnecki, V. Ufimtsev, and A. Asaithambi, "Correlation clustering- based multi-robot task allocation: a tale of two graphs," ACM SIGAPP Applied Computing Review, vol. 19, No. 4, pp. 5-16, 2020.
M. Afrin, J. Jin, A. Rahman, Y.-C. Tian, and A. Kulkarni, "Multiobjective resource allocation for edge cloud based robotic workflow in smart factory," Future Generation Computer Systems, vol. 97, pp. 119-130, 2019.
I. Suemitsu, K. Izui, T. Yamada, S. Nishiwaki, A. Noda, and T. Nagatani, "Simultaneous optimization of layout and task schedule

(56) References Cited

OTHER PUBLICATIONS for robotic cellular manufacturing systems," Computers & Industrial Engineering, vol. 102, pp. 396-407, 2016.
Y. Koren, W. Wang, and X. Gu, "Value creation through design for scalability of reconfigurable manufacturing systems," International Journal of Production Research, vol. 55, No. 5, pp. 1227-1242, 2017.
J. Chen and D. Sun, "Coalition-based approach to task allocation of multiple robots with resource constraints," IEEE Transactions on Automation Science and Engineering, vol. 9, No. 3, pp. 516-528, 2012.
C. Henkel, J. Abbenseth, and M. Toussaint, "An optimal algorithm to solve the combined task allocation and path finding problem," arXiv preprint arXiv:1907.10360, 2019.
J. Zhou, X. Zhao, X. Zhang, D. Zhao, and H. Li, "Task allocation for multi-agent systems based on distributed many-objective evolutionary algorithm and greedy algorithm," IEEE Access, vol. 8, pp. 19 306-19 318, 2020.
L. Liu and D. A. Shell, "Large-scale multi-robot task allocation via dynamic partitioning and distribution," Autonomous Robots, vol. 33, No. 3, pp. 291-307, 2012.
W. Wang and Y. Jiang, "Community-aware task allocation for social networked multiagent systems," IEEE transactions on cybernetics, vol. 44, No. 9, pp. 1529-1543, 2013.
M. Otte, M. J. Kuhlman, and D. Sofge, "Auctions for multi-robot task allocation in communication limited environments," Autonomous Robots, vol. 44, No. 3, pp. 547-584, 2020.
F. Zitouni, S. Harous, and R. Maamri, "A distributed approach to the multi-robot task allocation problem using the consensus-based bundle algorithm and ant colony system," IEEE Access, vol. 8, pp. 27 479-27 494, 2020.
A. Liu, M. Pfund, and J. Fowler, "Scheduling optimization of task allocation in integrated manufacturing system based on task decomposition," Journal of Systems Engineering and Electronics, vol. 27, No. 2, pp. 422-433, 2016.
B. P. Gerkey and M. J. Mataric, "A formal analysis and taxonomy of task allocation in multi-robot systems," The International journal of robotics research, vol. 23, No. 9, pp. 939-954, 2004.
Y. Fang, C. Peng, P. Lou, Z. Zhou, J. Hu, and J. Yan, "Digital-twin-based job shop scheduling toward smart manufacturing," IEEE Transactions on Industrial Informatics, vol. 15, No. 12, pp. 6425-6435, 2019.
D. Baumann, F. Mager, U. Wetzker, L. Thiele, M. Zimmerling, and S. Trimpe, "Wireless control for smart manufacturing: Recent approaches and open challenges," Proceedings of the IEEE, vol. 109, No. 4, pp. 441-467, 2021.
Z. Zhuang, Z. Huang, Y. Sun, and W. Qin, "Optimization for cooperative task planning of heterogeneous multi-robot systems in an order picking warehouse," Engineering Optimization, pp. 1-18, 2020.
G. A. Korsah, A. Stentz, and M. B. Dias, "A comprehensive taxonomy for multi-robot task allocation," The International Journal of Robotics Research, vol. 32, No. 12, pp. 1495-1512, 2013.
V. Tereshchuk, J. Stewart, N. Bykov, S. Pedigo, S. Devasia, and A. G. Banerjee, "An efficient scheduling algorithm for multi-robot task allocation in assembling aircraft structures," IEEE Robotics and Automation Letters, vol. 4, No. 4, pp. 3844-3851, 2019.
H. Touzani, H. Hadj-Abdelkader, N. S'eguy, and S. Bouchafa, "Multirobot task sequencing automatic path planning for cycle time optimization: Application for car production line," IEEE Robotics and Automation Letters, vol. 6, No. 2, pp. 1335-1342, 2021.
A. Maoudj, B. Bouzouia, A. Hentout, A. Kouider, and R. Toumi, "Distributed multi-agent scheduling and control system for robotic flexible assembly cells," Journal of Intelligent Manufacturing, vol. 30, No. 4, pp. 1629-1644, 2019.
K. Chen, T. Zhang, R. D. Gitlin, and G. Fettweis, "Ultra-low latency mobile networking," IEEE Network, vol. 33, No. 2, pp. 181-187, 2019.
J. Wang, Y. Zhang, Y. Liu, and N. Wu, "Multiagent and bargaininggame-based real-time scheduling for internet of things-enabled flexible job shop," IEEE Internet of Things Journal, vol. 6, No. 2, pp. 2518-2531, 2019.
S. Choudhury, J. Gupta, M. Kochenderfer, D. Sadigh, and J. Bohg, "Dynamic Multi-Robot Task Allocation under Uncertainty and Temporal Constraints," in Proceedings of Robotics: Science and Systems, Corvalis, Oregon, USA, Jul. 2020.
Z. Jiang, Y. Jin, M. E, and Q. Li, "Distributed dynamic scheduling for cyber-physical production systems based on a multi-agent system," IEEE Access, vol. 6, pp. 1855-1869, 2018.
X. Li, D. Li, J. Wan, A. V. Vasilakos, C.-F. Lai, and S. Wang, "A review of industrial wireless networks in the context of industry 4.0," Wireless networks, vol. 23, No. 1, pp. 23-41, 2017.
C. Qian, Y. Zhang, C. Jiang, S. Pan, and Y. Rong, "A real-time datadriven collaborative mechanism in fixed-position assembly systems for smart manufacturing," Robotics and Computer-Integrated Manufacturing, vol. 61, p. 101841, 2020.
L. Zhao and K. Chen, "The game theoretic consensus in a networked multi-agent system," in 2018 IEEE Global Communications Conference (GLOBECOM). IEEE, 2018, pp. 1-7.
E. Genender, C. L. Holloway, K. A. Remley, J. M. Ladbury, G. Koepke, and H. Garbe, "Simulating the multipath channel with a reverberation chamber: Application to bit error rate measurements," IEEE Transactions on Electromagnetic Compatibility, vol. 52, No. 4, pp. 766-777, 2010.

* cited by examiner

500

---

Algorithm 1: SEARCH PLANNING

---

Data: $M$, $N$, $\omega_m$, $\epsilon_h$, $\epsilon_v$, $\epsilon_d$, $L$, $\{\lambda^l\}$.

plans = SEARCH_PLANNING($L$, $\{\lambda^l\}$)

for plan in plans do $F^t$ = RESIDUAL ($M$, $N$, $\omega_m$, $\epsilon_h$, $\epsilon_v$, $\epsilon_d$, plan)

$T, \mathcal{E} \leftarrow F^t$ solution_set $\leftarrow F^t, T, \mathcal{E}$ solution $\leftarrow$ solution_set return solution

---
Algorithm 2: RESIDUAL HYPERGRAPH SEARCH

---
Data: $M, N, \omega_m, \epsilon_h, \epsilon_v, \epsilon_d$, plan.
residual_graph ← $M, N, \omega_m, \epsilon_h, \epsilon_v, \epsilon_d$
while True do
    if p is the last element in plan then
        p ← First element in plan
    else
        p ← Next product in plan
    residual_graph, $\rho^p$ = CONSTRAINT(residual_graph, p, $\lambda^p$)
    if residual_graph == NULL or $\rho^p$ == NULL
    then
        return $\mathcal{F}^t$
    $\mathcal{F}^t$ ← $\rho^p$

| Algorithm 3: CONSTRAINT SEARCH |
|---|
| Data: residual_graph, p, $\lambda^p$. |
| task_flow ← $\lambda^p$) |
| current_vertex ← MAKE_CHOICE(NULL) |
| while task_flow != NULL do |
|     current_type ← current_vertex.type |
|     task ← first task in task_flow |
|     if task.type > current_type then |
|         vertices ← all (current_type + 1) vertices |
|         next_vertex, cost = MAKE_CHOICE(vertices) |
|         $\rho^p$ ← next_vertex, cost |
|         current_vertex = next_vertex |
|     else |
|         vertices ← all current_type vertices with positive remaining capability |
|         if vertices != NULL then |
|             next_vertex, cost = MAKE_CHOICE(vertices) |
|             $\rho^p$ ← next_vertex, cost |
|             residual_graph ← next_vertex |
|             current_vertex = next_vertex |
|             task_flow.pop(task) |
| return residual_graph, $\rho^p$ |

FIG. 7

HYPERGRAPH SEARCH FOR REAL-TIME MULTI-ROBOT TASK ALLOCATION IN A SMART FACTORY

CROSS-REFERENCE TO RELATED APPLICATIONS

This application claims the benefit of U.S. provisional patent application No. 63/143,978 filed on Feb. 1, 2021, and entitled "HYPERGRAPH SEARCH FOR REAL-TIME MULTI-ROBOT TASK ALLOCATION IN A SMART FACTORY," the disclosure of which is expressly incorporated herein by reference in its entirety.

FIELD

The disclosure generally relates to methods and systems implementing real-time multi-robot task allocation (MRTA) for a smart factory.

BACKGROUND

Industry 4.0 and smart manufacturing suggests a new technological paradigm, which integrates control, computing, Internet, and wireless networking. Smart factories play a central role in this new technological paradigm. Industry 4.0 and smart manufacturing expect smart factory response to small-batch production requests quickly and profitably. Different from factory automation, a smart factory must achieve production flexibility, productivity, resource and energy efficiency, and sustainability, as well as profitability, competitiveness, and social responsibility. Individualized, on-request production requests from the market as well as the desire for better flexibility, productivity, and profit result in shorter product development period, more frequent market and supply chain analyses, and thus bring more frequent adjustment of production flow in smart factory.

A smart factory may comprise a reconfigurable Multi-Robot System (MRS), which includes production robots and Autonomous Mobile Robots (AMR) as transportation robots such as Unmanned Ground Vehicles (UGVs), Automated Guided Vehicles (AGVs), and Unmanned Aerial Vehicles (UAVs) and holistic integration of wireless networked Cyber-Physical System (CPS). The smart factory performs real-time decision making and control of reconfigurable MRS, assisted by the industrial wireless communication and networks, and AI, big data driven computing to fulfill the flexible, productive, energy efficient, and profitable production. Under this paradigm, real-time control and coordination of MRS to deal with manufacturing task with dynamic type and number can be achieved by real-time, repetitive Multi-Robot Task Allocation (MRTA).

Classical Multi-Robot Task Allocation (MRTA) is commonly treated as a combinatorial optimization problem and is well investigated for static production flows. Two classical combinatorial optimization methods, Linear Programming (LP) (including Integer Programming (IP) and Mixed Integer Programming (MIP)) and Genetic Algorithms (GA) methods, are commonly adopted to solve MRTA. Other methods including search methods, graphical methods, and decentralized (auction) methods are also known.

However, in the context of reconfigurable MRS driven smart factories, elaborating MRTA in a smart factory faces several technological opportunities. First, a dual-agent optimization problem is put forward which focuses on through-put of production robots, and energy consumption of AGVs' navigation. MRTA in smart factory should at least dynamically optimize throughput from production robots and energy efficiency from AGVs at the same time, which has not been explored except with respect to a very special and static case.

Second, MRTA is proven NP-hard, especially for dual-objective and dual-agent. The tradeoff between time complexity and optimality is vital to real-time application and production reliability over time: global optimal solution all-time take heavy computation and may lead to dramatic time-lag toward unstable dynamic operation. Conventional LP and exhaustive search methods are still far from real-time purpose.

Third, for the purpose of flexible, dynamic, and dual-objective MRTA, it is desirable to treat MRTA as an integral MRS, rather than individual robot utility or fixed sequences of tasks.

It is with respect to these and other considerations that the various aspects and embodiments of the present disclosure are presented.

SUMMARY

This disclosure describes the development of the task assignment for multi-robot systems (MRSs) in a smart factory (Industry 4.0).

Some aspects are directed to a hypergraph based MRS and production model facilitating the cooperation among robots and serving frequent reconfiguration desired in Industry 4.0.

Some aspects are directed to a time complexity friendly search algorithm for real-time application using a hypergraph model to get task assignment(s). Parameters are provided for a tradeoff between solution optimality and time complexity.

In an implementation, a system comprises a MRS comprising a plurality of robots, wherein the MRS is configured to perform a manufacturing task, and a computing device configure to perform a multi-robot task allocation (MRTA) for the MRS.

In an implementation, a method comprises generating task assignments, using MRTA, for a plurality of robots of a MRS comprising the plurality of robots, wherein the MRS is configured to perform a manufacturing task, and providing the task assignments to the MRS.

Implementations may include at least some of the following features. The MRTA is performed in real-time. The MRTA is configured to generate real-time decisions regarding tasks for the robots. The plurality of robots comprises a plurality of production robots and a plurality of AMRs. The MRTA is configured to generate task assignments for the production robots and transportation paths for the AMRs from dynamic manufacturing demands. A hypergraph production robot model is configured based on the MRS of the smart factory. A hypergraph search algorithm is configured to use the hypergraph model to generate the task assignments or the transportation paths with optimized overall system productivity and energy efficiency of transportation. The task assignments and the transportation paths are adjustable in real-time through repetitive execution of the algorithm. The computation complexity (time complexity of the algorithm) has room to trade-off with task assignment optimality.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 5 shows pseudocode for an implementation of a search planning algorithm;

FIG. 6 shows pseudocode for an implementation of a residual hypergraph search algorithm;

FIG. 7 shows pseudocode for an implementation of a constraint search algorithm.

DETAILED DESCRIPTION

The following description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Unless defined otherwise, all technical and scientific terms used herein have the same meaning as commonly understood to one of ordinary skill in the art to which this invention belongs. As used in the specification and claims, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur. Publications cited herein are hereby specifically incorporated by reference in their entireties and at least for the material for which they are cited.

In order to facilitate the goal of Industry 4.0 and smart manufacturing, a smart factory comprising a Multi-Robot System (MRS) flexibly achieves mass production of individualized products profitably through time dynamic adjustment of production flows while optimizing the energy efficiency of MRS. A smart factory therefore has dynamic production scheduling and Multi-Robot Task Allocation (MRTA). Real-time MRTA for the smart factory is described. The challenge of frequent production adjustment with the reconfiguration of MRS including task assignment of production robots and transportation path of AGVs is addressed. The dual-objective, dual-agent optimization of productivity and energy efficiency, is fulfilled, along with time sensitive computation. To accomplish the above goals, a hypergraph is described to model the flexible production process. A nested hypergraph search algorithm with constant time complexity is provided to enable dynamic production. The real-time MRTA delivers near-optimal resilient performance in throughput and energy efficiency that is an emerging but critical issue, with low computational complexity.

Figure 1:
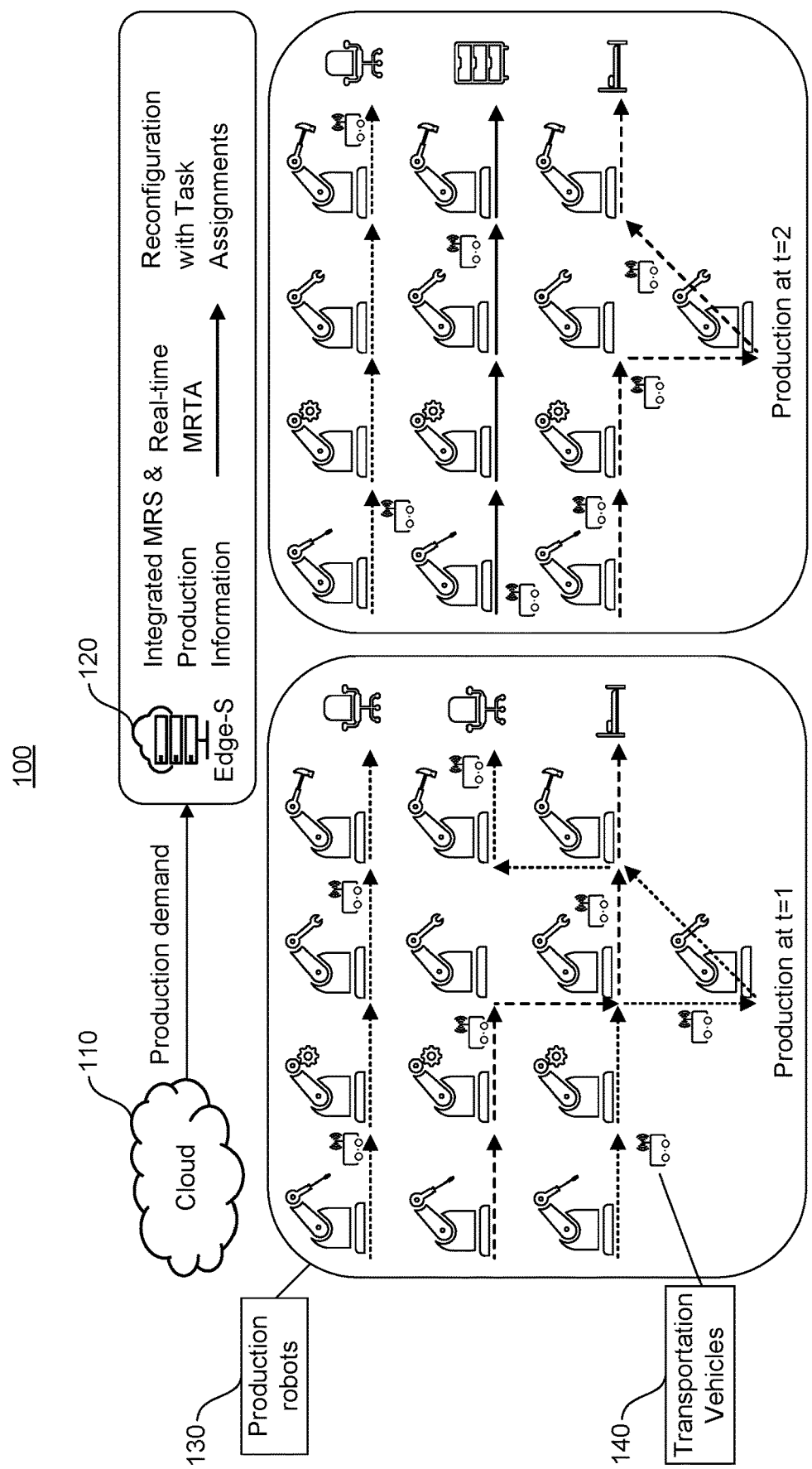
FIG. 1 is an illustration of an example time dynamic task assignment and execution in a smart factory.

Under the reconfigurable MRS driven smart factories, instead of generating static tasks and assignments, MRTA can be re-defined and serves a vital role of flexible production and optimization in smart factories. FIG. 1 is an illustration of an example time dynamic task assignment and execution 100 in a smart factory. As shown in FIG. 1, the cloud computing 110 determines the time-dynamic production demand. An edge server 120 supplies computation for controlling, gathers MRS information and production demands, performs real-time MRTA that translates to the reconfiguration with task assignments for production robots 130 and transportation paths to transportation vehicles (e.g., AGVs) 140.

FIG. 1 depicts the MRS reconfiguration of production robots and AGVs to dynamically produce different products by real-time MRTA with this architecture. The arrows show the sequential execution of the production tasks by production robots and transportation paths of AGVs, which is denoted by the production flow herein. Therefore, each agent dynamically executes assigned tasks from real-time MRTA and carries out flexible production of collaborative MRS, and the task assignment smartly determines the individual robot utility, AGV transportation efficiency, and further impact on productivity, throughput, and energy efficiency.

Taking advantage of edge computing to execute centralized MRTA and wireless networking to transmit dynamic control messages, implementations and embodiments herein innovate real-time MT-SR-IA type MRTA for both production robots and the paths of AGVs to enable a dynamic, flexible, and resilient smart factory. Further technical contributions include (i) based on the time slotted structure of robot actions, a temporal-spatial model for the MRS has been developed to form a dual-objective MRTA problem considering both throughput of production robots and energy efficiency of AGVs; (ii) for efficient temporal-spatial modeling and subsequent computations, a hypergraph approach is adopted while preserving engineering meaning of classic graphical models; (iii) a constant time hypergraph search algorithm with adoption of search constraints and greedy heuristics is described to solve MRTA with dual-objective, dual-agent optimization. A nested search architecture with search plan, bootstrapping and importance sampling provides sufficient tradeoff between solution optimality and algorithm time complexity; and (iv) to significantly reduce computational complexity toward real-time and resilient MRTA, "good" conditions have been identified to rapidly obtain appropriate solutions.

Figures 2A, 2B:
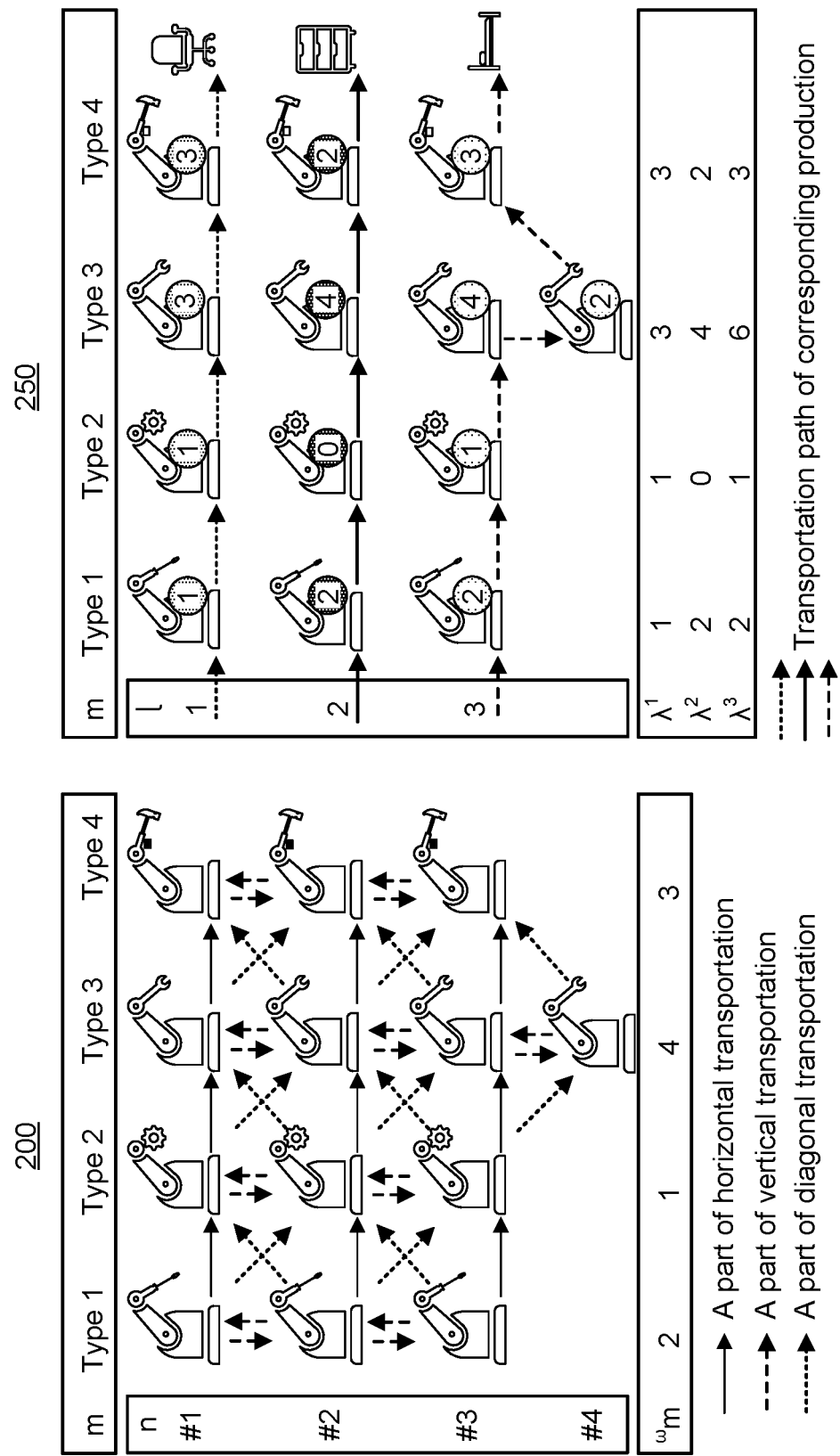
FIG. 2A is an illustration of an implementation of a temporal-spatial production robot model showing a temporal-spatial model of a MRS.
FIG. 2B is an illustration of an implementation of a temporal-spatial production robot model showing an operation example of a MRS model.

An MRTA with temporal-spatial MRS model in a smart factory is described. FIG. 2A is an illustration of an implementation of a temporal-spatial production robot model showing a temporal-spatial model of a MRS 200, and FIG. 2B is an illustration of an implementation of a temporal-spatial production robot model showing an operation example of a MRS model 250.

With respect to FIG. 1, the edge computing executes real-time MRTA according to the production demand and uses wireless networking to reconfigure the MRS of both production robots and AGVs in a smart factory. Given a time slotted synchrony and fixed locations for production robots, the production flows following the MRTA and subsequent paths for AGV are formed using a temporal-spatial operation as FIG. 2A illustrates.

The multiplexing capability of a robot is defined by the number of tasks finished in one time slot, which supply the temporal feature. The energy of transportation between adjacent two robots is quantized by the Euclidean distance as the spatial feature, in which the transportation is assumed perfect with guaranteed completed without considering time. The temporal-spatial MRS fulfills flexible production in terms of the different product types and different numbers of production executing in MRS assisted by real-time MRTA and reconfiguration of MRS, which suggests a brand new MRTA problem in and deliberated optimization problems.

Suppose there are M types of production robots in a smart factory, which are lined in order as FIGS. 2A and 2B, and there are $N_m$ type m robots denoted by $N=(N_1, N_2, \ldots, N_m, \ldots, N_M)$, $R_{m,n}$, m=1, 2, ..., M, n=1, 2, ..., $N_m$ labels there robots, placed and aligned to top in each column with each column subject to one of M types of tasks. The number of tasks a robot can execute in parallel in a time slot, is known as multiplexing capability denoted by vector $\omega=(\omega_1, \omega_2, \ldots, \omega_m, \ldots, \omega_M)$ which suggests type m robots can finish $\omega_m$ tasks in a time slot, m=1, 2, ..., M.

FIG. 2A visualizes a production robot system consisting of M=4 types of robots with number vector N=(3, 3, 4, 3) and multitask capability vector $\omega$=(2, 1, 4, 3).

The products can only be transported between the adjacent neighbors in column, row, or diagonal. The corresponding transportation energy consumption is quantized by $\epsilon_h$ for horizontal transportation, $\epsilon_v$ for vertical transportation, and $\epsilon_d$ for diagonal transportation as shown in FIG. 2A.

In actual production, the number of task demands is related to the production robots as well as the products in production. Therefore, assuming dynamic production demand for multiple products has notation ι as the product type, without loss of generality, production of a product-ι can be decomposed into a series of tasks that executed by type-m with production robots in ascending order, denoted by vector $\lambda^\iota=(\lambda_1^\iota, \lambda_2^\iota, \ldots, \lambda_m^\iota, \ldots, \lambda_M^\iota)$ whose elements $\lambda_m^\iota$ denote the number of type-m tasks to manufacture product-ι as specified in the bottom of FIG. 2B. Considering product-ι may not need all types of tasks, $\lambda_m^\iota$ can be zero but the sum of all M elements in $\lambda^\iota$, $\Sigma_{m=1}^M \lambda_m^\iota$ would be greater than 0 in reality.

FIG. 2B visualizes production of three products on top of the MRS model, with the various shading indicating production flows of three products including $\lambda_m^\iota$, the executor robots, and transportation path.

By defining the temporal-spatial MRS model for smart factories, manufacturing a product has evolved from static flow into a temporal task execution process completed by a series of robots following sequential constrains. MRTA fulfills the dynamic production demand $\{\lambda^\iota\}$ by calculating the tasks to each production robot $R_{m,n}$ and transportation path.

A hypergraph approach for real-time MRTA is described. The temporal-spatial MRS model described above fulfills dynamic, flexible production for smart factories. However, to avoid sacrificing productivity, the reconfiguration of MRS needs to be performed within a short time after receiving changes. Additionally, the task assignments to production robot determine their utility and transportation paths determine the transportation distance. Therefore, smart factory MRTA takes computational complexity, resilience vs. multi-objective optimality, into account.

MRTA can be intuitively solved by the graphical algorithms. However, considering multiplexing capability of a production robots, the classical graphical search methods, especially objective function based, exhaustive search methods, suffer from massive search space and potentially lead to factorial time complexity, let alone the ascending task execution constraints and multi-objective optimality.

A desirable real-time MRTA is innovated by providing herein a hypergraph approach to scale search space linear to the number of production robots in MRA, where vertices are enhanced to hyper-vertices to represent multiplexing capabilities. Meanwhile, the hypergraph model provides the necessary condition of feasibility, denoted as permissible condition, enabling verification of feasibility of this NP-hard problem without exhaustive search. Moreover, the production flow of certain products, the task assignment of each production robot can be obtained readily from the hypergraph model.

Further, optimizing productivity and energy efficiency is achieved by a nested hierarchy hypergraph search algorithm where maximum flow heuristic optimizes productivity and greedy heuristic optimize energy efficiency.

A hypergraph model of a production robot system is described. A hypergraph $H(\{R_{m,n}\}, E)$, m=1, 2, ... M, n=1, 2, ..., $N_m$, is a directed hypergraph with each hyper-vertex representing a robot (denoted by $R_{m,n}$ for simplicity). Each hyper-vertex is a set of blocks $\beta_{m,n}^b$, b=1, 2, ..., $\omega_m$, so that the length of $R_{m,n}$ is equal to its multi-task capability $\omega_m$, as follows:

$$R_{m,n}=\{\beta_{m,n}^1, \beta_{m,n}^2, \ldots, \beta_{m,n}^{\omega_m}\} \quad (1)$$

The block $\beta_{m,n}^b$ is a numerical variable representing a single task capability of robot $R_{m,n}$ and its assignment. If $\beta_{m,n}^b=0$, it is an unassigned block, if $\beta_{m,n}^b=\iota$, the b'th task capability of robot $R_{m,n}$ is assigned for production of product-ι. Meanwhile, vertices inherit the robot type, spatial distribution, and neighboring property of the production robot model, which is indicated by the m and n in vertex notation $R_{m,n}$, which represents the n'th type-m robot. On the other hand, directed edge set E represents a set of transportation path with corresponding quantized energy consumption as weights:

$E=\{e_{i,j:i',j'}\}=(R_{i,j}, R_{i',j'})$, $R_{i,j}$ and $R_{i',j'}$ are neighboring vertex pairs in a hypergraph H.

Figures 3A, 3B:
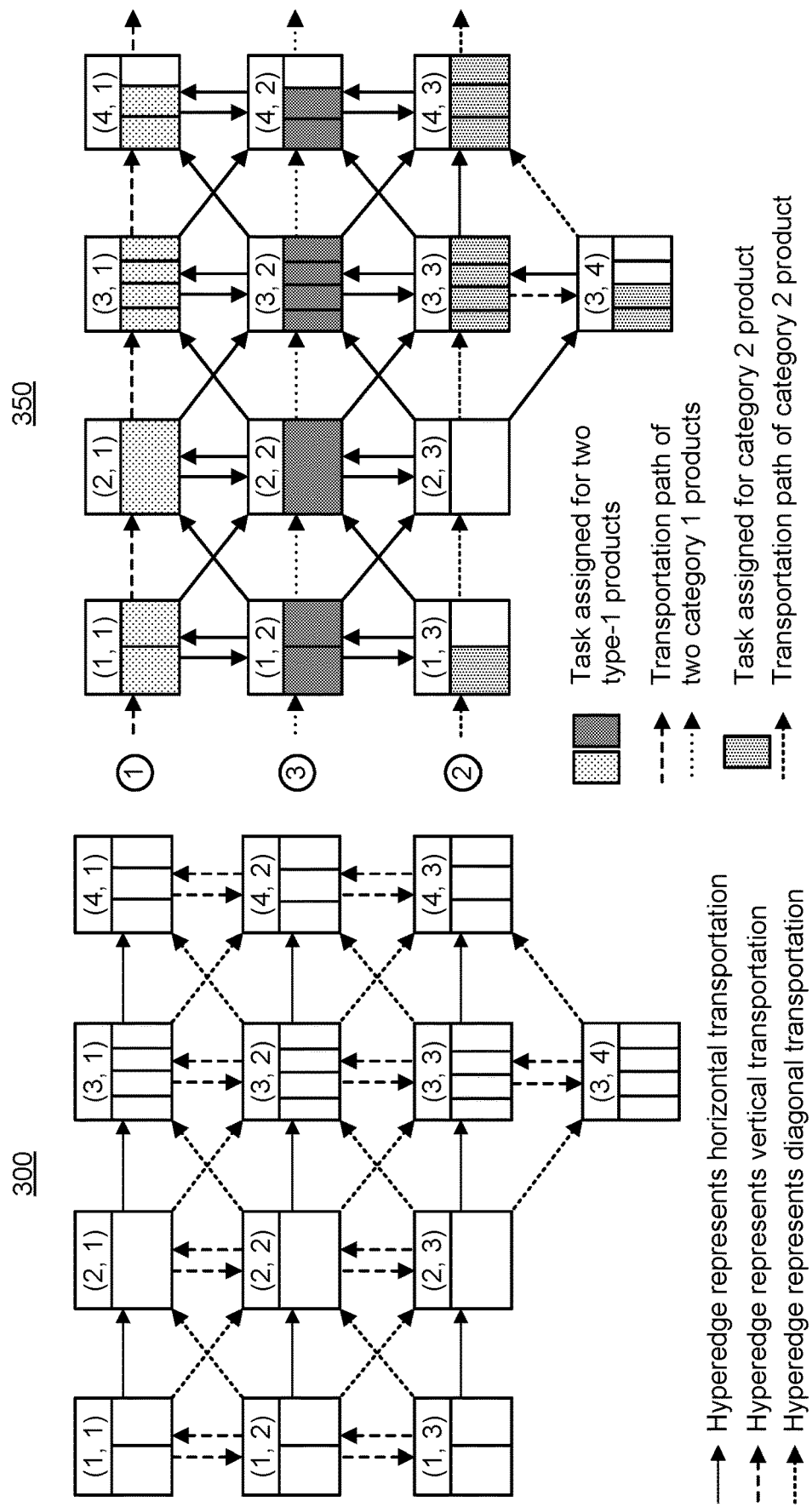
FIG. 3A is an illustration of an implementation of a production robot model showing an example of a hypergraph MRS model.
FIG. 3B is an illustration of an implementation of a production robot model showing example MRTA task assignments and transportation path representation.

FIG. 3A is an illustration of an implementation of a production robot model showing an example of a hypergraph MRS model 300, and FIG. 3B is an illustration of an implementation of a production robot model showing example MRTA task assignments and transportation path representation 350. For example, FIG. 3A gives the hypergraph model of production robots system in FIG. 2A. Edge $(R_{1,1}, R_{2,1})$ is a directed edge with hyper-vertex $R_{1,1}$ as head and $R_{2,1}$ as tail, and weight $\epsilon_h$.

Real-time MRTA under hypergraph model is described. With respect to a permissible condition for production scheduling, because MRTA is known as a NP-hard problem, the real-time algorithm enables the verification of feasibility without exhaustive search benefit from the consistency of type between single-task robot and production task to be manufactured in temporal-spatial MRS model. Therefore, given a production demand, permissible condition is a necessary condition that the demand can be fulfilled by the MRS, which can be readily obtained from hypergraph MRS model.

The permissible condition is that the joint task demand should not exceed the joint multi-task capability of all production robots in one time slot. Mathematically, for each type-m production robot subsystem, given demand $\lambda^\iota$ the inequality in equation (2) needs to be fulfilled.

$$\Sigma_{\iota=1}^{L}\lambda_m^\iota \leq N_m \omega_m \qquad (2)$$

The permissible condition is important in real-time applications. A good production decision should always keep the permissible conditions even with extra margins to avoid the failure of production.

With respect to real-time MRTA with a multi-objective solution output, a multi-objective solution output not only includes productivity and energy efficiency, but also includes production flow for edge level decision making and task assignment for each production robot. A hypergraph approach achieves this with little effort by introducing simple path as a production flow instead of traditional objective functions. A simple path $\rho^\iota$ in the hypergraph model is a sequence of node with edges embedded, representing the production flow of product-$\iota$. As in equation (3a), production flow of product-$\iota$ starts from $R_{i_1,j_1}$, ends at $R_{i_v,j_v}$ with v robots and v-1 edges denoted by $(R_{i_1,j_1}, R_{i_2,j_2})$, $(R_{i_2,j_2}, R_{i_3,j_3})$ and so forth. The complete solution given demand $\{\lambda^\iota\}$ with $\iota=1, 2, \ldots, F$ is $\mathcal{F}$ a set of simple paths of each demanded product. As in equation (1), the element in $R_{i_1,j_1}$ gives the task assignment to $j_1$'th type-$i_1$ robot. The edges in $\rho^\iota$ give the transportation path for product-$\iota$.

$$\rho^\iota=(R_{i_1,j_1}, R_{i_2,j_2}, R_{i_3,j_3}, \ldots, R_{i_v,j_v}) \qquad (3a)$$

$$\mathcal{F}=\{\rho^1, \rho^2, \rho^3, \ldots, \rho^L\} \qquad (3b)$$

Productivity and energy efficiency of real-time MRTA task assignment is described. As another important aspect of MRTA output, productivity and energy efficiency are two objectives that smart factory expect to optimize. Two numerical metrics are introduced to evaluate the performance of MRTA: throughput $\tau$ and energy efficiency $\epsilon$. Throughput is a simple measure of total output from a factory to reflect the productivity.

Given a solution in equations (3a) and (3b) with L product demanded, let $\tau^\iota$ denote the number of time slots to complete product-$\iota$. To acquire the overall throughput, here the time slot defined above is adopted as the unit time since the definition of real-time MRTA is based on one time slot. This enables a search algorithm to evaluate the throughput right after getting the MRTA assignment and further reduce the time complexity. Thus, the throughput is the number of completed products normalized by time slot.

$$\mathcal{T} = \frac{1}{\tau^1} + \frac{1}{\tau^1} + \cdots + \frac{1}{\tau^L} \qquad (4)$$

As for energy efficiency, again in the solution in equations (3a) and (3b), let function $w(\cdot)$ denote the weight of inputted edge, which is one of $\epsilon_h$, $\epsilon_v$, and $\epsilon_d$. The overall energy consumption $\epsilon$ is then defined in product average of all edge weights in equations (3a) and (3b) to make it consistent to the throughput definition and for better decision making towards profitable production. Further, to get the energy efficiency from energy consumption, a reciprocal is adopted as in equation (5):

$$\varepsilon = \frac{1}{\epsilon} = \frac{L}{\Sigma_{l=1}^{L}(\Sigma_{i,j \in \rho^l} w(e_{i,j;i+1,j+1}))} \qquad (5)$$

Figure 4A:
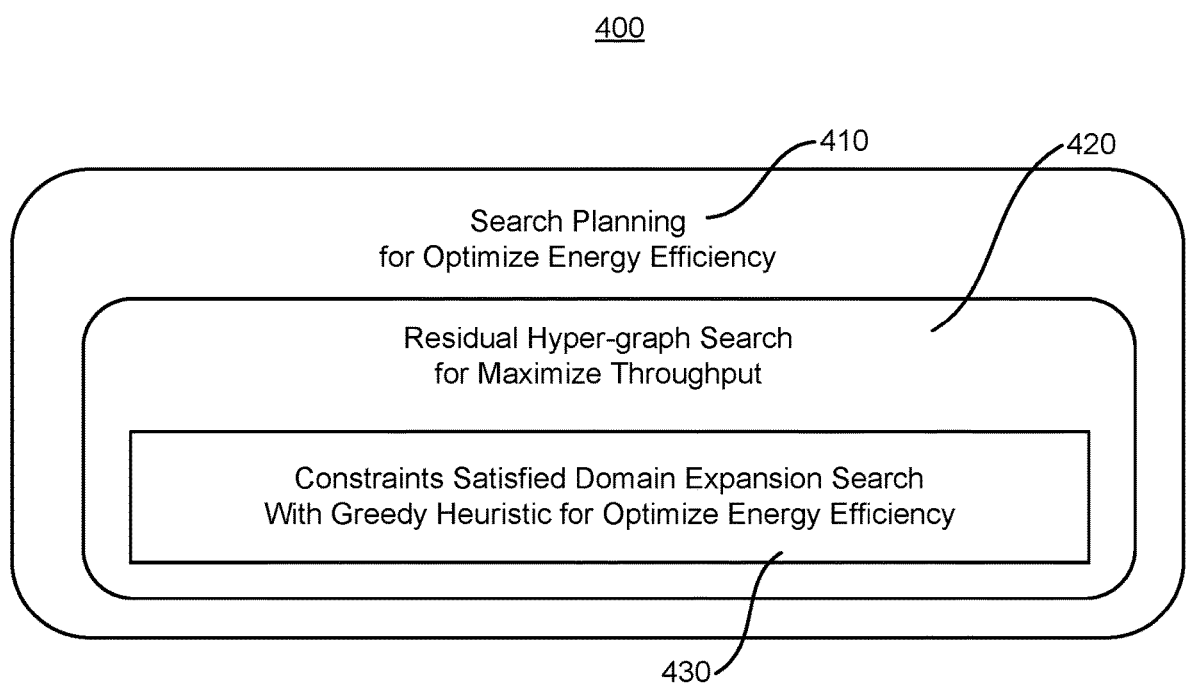
FIGS. 4A and 4B show operational flows of implementations of a method of a nested hierarchy hypergraph search algorithm.
Figure 4B:
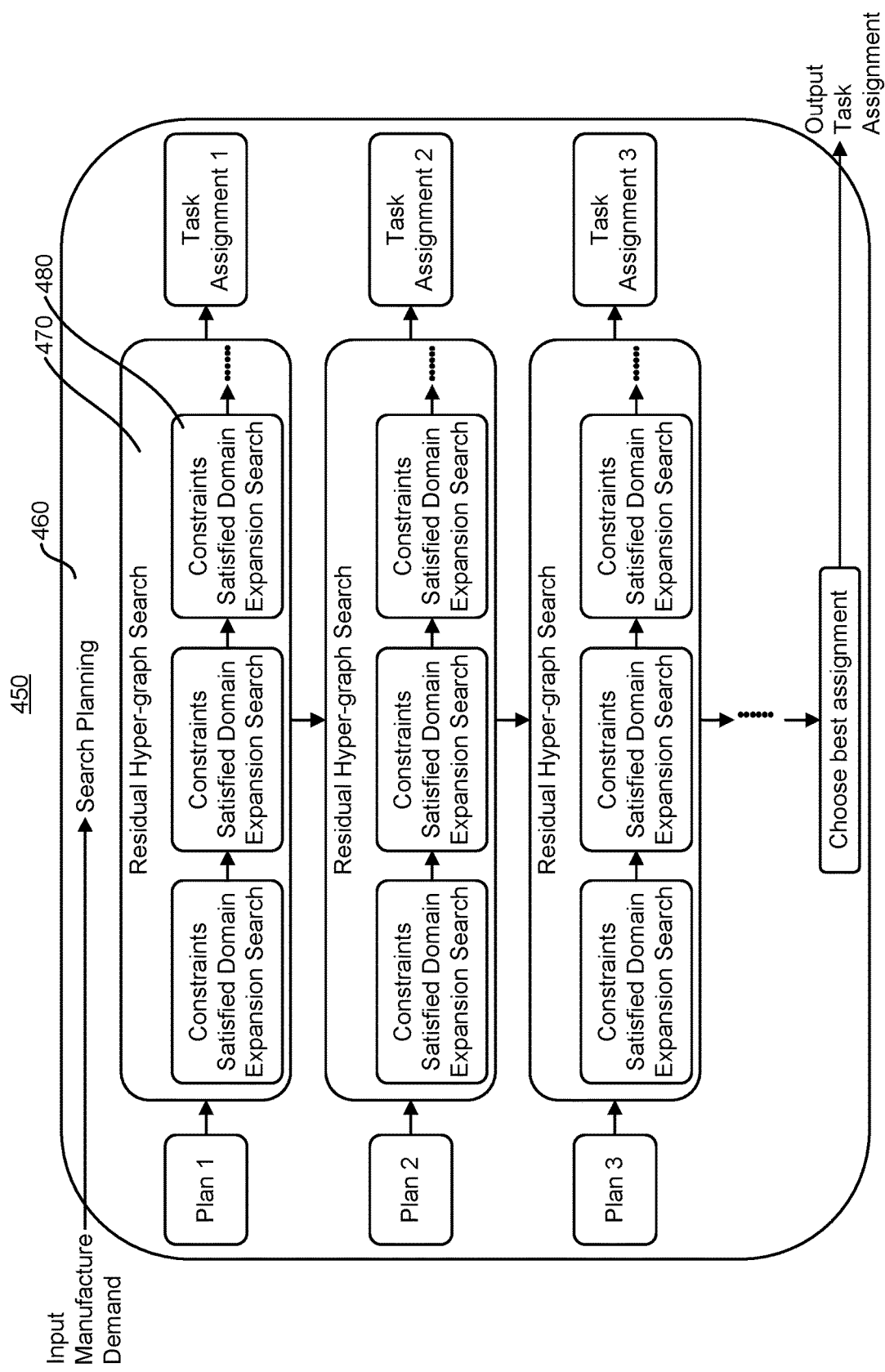

Hypergraph search for dual-objective and dual-robot optimization is now described. A classical graphical method solves MRTA by optimizing an objective function and performing an exhaustive search to find a subset of values as output, which will result in mass graph vertices and edges when it is a large production robot system with multi-task capabilities. However, smart factory MRTA calls for an algorithm with well scaled time complexity for real-time decision making without sacrificing striking optimality. Therefore, based on the above hypergraph model and real-time MRTA definition, a nested hierarchy hypergraph search algorithm is provided with three stages as shown in FIGS. 4A and 4B, and described further herein: search planning at 410 and 460, residual hypergraph search with maximum flow heuristic at 420 and 470, and constraints satisfied domain expansion search at 430 and 480 (denoted as constraint search herein). FIGS. 4A and 4B are operational flows of implementations of a method 400, 450, respectively, of a nested hierarchy hypergraph search algorithm.

Search planning is performed at the first stage (e.g., 410, 460). FIG. 5 shows pseudocode for an implementation of a search planning algorithm 500. At the first stage, as in the pseudocode Algorithm 1 show in FIG. 5, after getting $\lambda^1, \lambda^2, \ldots, \lambda^L$ of L products, SEARCH_PLANNING generates product type sequences with same set of L products but distinct orders. After that, each plan is fed to the next stage, residual hypergraph search. Next, the second stage, residual hypergraph search will be executed iteratively for each plan sequence. The third stage, constraint search will be executed iteratively in the residual hypergraph from the second stage, for each product in the sequence.

A residual hypergraph search is performed at the second stage (420, 470). FIG. 6 shows pseudocode for an implementation of a residual hypergraph search algorithm 600. This stage takes the product type sequence as input, adopts a maximum flow intuition by regarding the hypergraph model as a multi-source, multi-sink network, where type-1 vertices are sources and last type vertices are sinks.

Let $r(R_{m,n})$ denote the remaining multi-task capability of vertex $R_{m,n}$, function $r(\cdot)$ returns the number of unassigned blocks in the variable vertex, as given in equation (6). The "residual hypergraph" $H_r$ is thus the hypergraph with every vertex's remaining multi-task capability.

$$H_r = (\{r(R_{m,n})\}, E) \quad (6)$$

As in Algorithm 2 shown in FIG. 6, the function RESIDUAL_HYPERGRAPH (shown as residual_graph) takes the variable "plan", a sequence of product type as input, iteratively calls constraint search with a vector $\lambda^\iota$ following the sequence. Initially, the vertices in residual hypergraph are unassigned, with remaining multi-task capability $r(R_{m,n})$ equals to $\omega_m$. Instead of traversing the "plan" sequence then terminate, the failure of getting production flow for a product model or all the vertices are fully assigned are the termination condition. Therefore, some products may be fed to constraint search multiple times so that multi-task capability of production robots can be fully exploited for better throughput. As a result, first several products in the plan sequence are more likely to get multiple production flows as well as more energy efficient production flows, which explains the importance of the search planning: the order that the constraint search is called determines the total throughput and energy efficiency.

A constraint satisfied domain expansion search with greedy heuristic is performed at the third stage (430, 480). FIG. 7 shows pseudocode for an implementation of a constraint search algorithm 700. The third stage take vector $\lambda^\iota$ as input, adopt the intuition from state search algorithm for constraints satisfaction problem. The first constraint is the production flow $\rho^\iota$ must follow the sequence of element in vector $\lambda^\iota$. Secondly, the summation of type-m task assignment in a path should be equal to the corresponding element in $\lambda^\iota$ as in equation (7), where function $c(R_{m,n},\iota)$ returns the number of blocks $\beta_{m,n}^i = \iota$ and $\beta_{m,n}^i \in R_{m,n}$. Thirdly, for type-m vertices, the remaining number of elements in vertices should be equal or larger than the summation of type-m task assignment of the path so that the assignment will not overflow, as in equation (8).

$$\lambda_m^\iota = \Sigma_{n=1}^{N_m} c(R_{m,n},\iota), \text{ for all the } R_{m,n} \in \rho^\iota \quad (7)$$

$$\Sigma_{n=1}^{N_m} r(R_{m,n}) \leq \Sigma_{n=1}^{N_m} c(R_{m,n},\iota) \quad (8)$$

As in Algorithm 3 shown in FIG. 7, the generation and read of variable "task_flow" makes sure the first two constraints are satisfied. Node's remaining multi-task capability is considered as vertex state as expansion the search space to satisfy the third constraint, given by variable "vertices". When current task type is larger than current vertex type, "vertices" variable is assigned from all next type vertices for transportation only. The goal state is given from an empty "task_flow" variable. Next, variable "vertices" will be the new search domain and function MAKE_CHOICE adopt greedy heuristic to randomly choose one of the vertices with least edge cost.

Regarding the complexity of the algorithm, to fulfill the real-time requirement in the context smart factory, the proposed hypergraph has linear time complexity taking MRS and vector $\lambda^\iota$ as input. The while loop in Algorithm 2 iterates over the product type sequence in the search plan until one type of robots runs out of their capability. Consider the worst case, each product needs one type-1 task. Thus, let $T_2$ denote the execution time of the one iteration of Algorithm 2 and $T_3$ for Algorithm 3, the worst-case execution time is a linear relationship to the input, which is $\omega_1 N_1 T_3$. All other lines take constant time $C_2$ to execute. The execution time of Algorithm 2 is $T_2 = \omega_1 N_1 T_3 + C_2$.

The while loop in Algorithm 3 iterates over the tasks in the task flow. Again, consider the worst case that a product need all types of tasks to finish, which means all $\lambda_m^\iota$ values values in vector $\lambda^\iota$ are positive, the length of the task flow is thus $\Sigma_{\iota=1}^L \lambda_m^\iota$. The execution time is a linear relationship to the input, which is $\Sigma_{\iota=1}^L \lambda_m^\iota C_{3,1}$. All other lines take constant time $C_{3,2}$ to execute. The execution time of Algorithm 3 is $T_3 = \Sigma_{\iota=1}^L \lambda_m^\iota C_{3,1} + C_{3,2}$.

Thus, the execution time of Algorithm 2 could be updated to $T = \omega_1 N_1 (\Sigma_{\iota=1}^L \lambda_m^\iota C_{3,1} + C_{3,2}) + C_2$ with time complexity is $\mathcal{O}(\omega_1 N_1 (\Sigma_{\iota=1}^L \lambda_m^\iota))$, a constant time. Further, consider the search plan in Algorithm 1, assume the for loop iterates over $n$ plan sequences and other lines could be executed in constant time $C_1$, the overall execution time will be $n T_2 + C_1$, that is: $n \omega_1 N_1 (\Sigma_{\iota=1}^L \lambda_m^\iota C_{3,1} + C_{3,2}) + C_2 + C_1$. The time completely of nested search is $\mathcal{O}(n)$ when $n$ dominate other input parameters, such as $n = L!$, adopted in the computation experiments.

It is noted that stage three of the algorithm makes a random decision when the expanded vertices have the same edge weights. The techniques perform biased sampling from the entire solution space with favor of higher throughput and higher energy efficiency. It is determined that instead of exhaustive search, the algorithm is essentially performing biased sampling in favor of the solutions with higher throughput and higher energy efficiency from the entire solution space. In addition, by observing the marginal distribution of throughput and energy efficiency, it is conjectured that the algorithm favors more on throughput than energy efficiency. The residual hypergraph search on search plans maximizes the throughput by iteratively calling constraint search to exploit the robot's multi-task capability. On the other hand, constraint search uses one-step greedy heuristic with certain randomness to include more edges with less weight in the production flow, making it far from global optimal.

It has been determined that the algorithm converges to a sub-local optimal solution and thus one execution cannot guarantee the optimality. Although the local optimal solution can be obtained from multiple execution, the number of execution time is still a tradeoff between time complexity and optimality, which is vital for the real-time application. Therefore, in addition to a hypergraph search algorithm, a mechanism is provided herein to determine whether a solution is "good", and then stop the iterative algorithm execution, as another part of the hypergraph approach.

With respect to the "good" solution set approximation, a marginal bound estimation is described. First, given the production robot model and production demand, in throughput estimation, equation (9) finds the robot type of least average finished products in one time slot by consider each type of robots as a separate subsystem. Thus, for type-m robots, the ratio of total multi-task capability over the total type-m task demands reflect the average finished product of type-m. Then, type-m̂ has the least ratio so that it is the "bottleneck" of the system, which indicates the best case in terms of the throughput. Equation (10) estimates the throughput upper bound with type-m̂ as the entire system capability as numerator and a product average minimum serving time as denominator. Equation (11) estimates the throughput lower bound with worst case, which is permissible condition: finish L products in one time slot, as numerator and a product average maximum serving time as denominator.

$$\hat{m} = \underset{m}{\operatorname{argmin}}\left(\frac{N_1 \omega_1}{\frac{1}{L}\Sigma_{l=1}^L \lambda_1^l}, \frac{N_2 \omega_2}{\frac{1}{L}\Sigma_{l=1}^L \lambda_2^l}, \ldots, \frac{N_m \omega_m}{\frac{1}{L}\Sigma_{l=1}^L \lambda_m^l}, \ldots, \frac{N_M \omega_M}{\frac{1}{L}\Sigma_{l=1}^L \lambda_M^l}\right) \quad (9)$$

$$\mathcal{U}_T = \frac{\frac{N_{\hat{m}} \omega_{\hat{m}}}{\frac{1}{L}\sum_{l=1}^{L} \lambda_{\hat{m}}^l}}{\frac{1}{L}\sum_{l=1}^{L}\sum_{m=1}^{M}\left\lceil\frac{\lambda_m^l}{\omega_m}\right\rceil} \quad (10)$$

$$\mathcal{L}_T = \frac{L_t}{\frac{1}{L_t}\sum_{l=1}^{L_t}\sum_{m=1}^{M}\min(N_m, \lambda_m^l)} \quad (11)$$

Second, for energy efficiency, the following analysis makes an extra assumption that energy consumption of transportation always has the relationship of $\epsilon_h < \epsilon_v < \epsilon_d$. Equation (12) estimates the energy efficiency upper bound from the "best case" scenario: transportation only happens along vertical and horizontal edges for intra-type transportation and inter-type transportation, respectively. Equation (13) estimates the energy efficiency lower bound from the "worst case" scenario: all the inter-type transportation is happened along diagonal edges.

$$\mathcal{U}_E = \frac{1}{\frac{1}{L_t}\sum_{l=1}^{L}\sum_{m=1}^{M}\left\{\begin{array}{c}(M-1)\epsilon_h + \\ \epsilon_v\sum_{m=1}^{M}\left[\frac{\lambda_m^l}{\omega_m}-1\right]\end{array}\right\}} \quad (12)$$

$$\mathcal{L}_E = \frac{1}{\frac{1}{L_t}\sum_{l=1}^{L}[(M-1)\epsilon_d + \epsilon_v\sum_{m=1}^{M}(\lambda_m^l - 1)]} \quad (13)$$

With respect to a "good" solution approximation, after getting the marginal distribution bounds estimations, with the Gaussian distribution assumption, $\mu_t$ and $\mu_e$ as the mean and $\sigma_t^2 \sigma_e^2$ as variance of marginal throughput and energy efficiency distribution respectively, can be approximated from bootstrapping.

First, obtain θ of initial solution samples in addition to the estimated upper bounds and lower bounds as the pool for bootstrapping and thus θ+2 elements in pool. Next, get B-bootstrapping samples with replacement and calculate mean $\mu_t$, $\mu_e$ and variance $\sigma_t^2 \sigma_e^2$ from sample mean and sample variance of B-bootstrapping samples, respectively. After that, construct two importance samplings of marginal throughput and energy efficiency distribution by letting their mean be the upper bound approximation of throughput $\mathcal{U}_T$ and energy efficiency $\mathcal{U}_E$, respectively, since they are made based on product average. Let $w_t$ and $w_e$ denote the likelihood (or weight) of two importance samplings, the standard deviations are $w\sigma_t^2$ and $w\sigma_e^2$. Thus, the desired optimal throughput and energy efficiency should lie around two importance sampling means, and then solutions with throughput and energy efficiency lie in 99% confidence interval can be adopted as the "good" solution which are $\mu_t \pm w_t\sigma_t$ for throughput and $\mu_e \pm w_e\sigma_e$ for energy efficiency. A termination condition may be determined based on the implementation (e.g., a maximum number of iterations or executions, desired number of solutions lie in 99% confidence interval of two importance samplings N, for decision making, etc.).

To summarize, the proposed hypergraph approach has three mechanisms for tradeoff between time complexity and optimality. In search planning, reducing the number of plans decreases the hypergraph search time complexity significantly. To generate the greatest number of plans, permutation can be adopted but with most time complexity. In bootstrapping, parameter θ determines the number of initial iterations. More initial iterations bring better approximation of solution distribution but larger time complexity. In importance sampling, $w_t$ and $w_e$ determine the iteration number after initial execution when the desired number of "good" solutions are not reached. Higher weight brings better optimality and more iterations.

Some implementations may comprise generating a set of task assignments from the same production demand, with numerical productivity and energy efficiency evaluation by product type for decision makers under practical application. The systems and methods, in some implementations, comprise a series of task assignments with different productivity, energy efficiency and priority of products, which is useful information for decision makers, or AI decision making algorithms and techniques.

Figure 8:
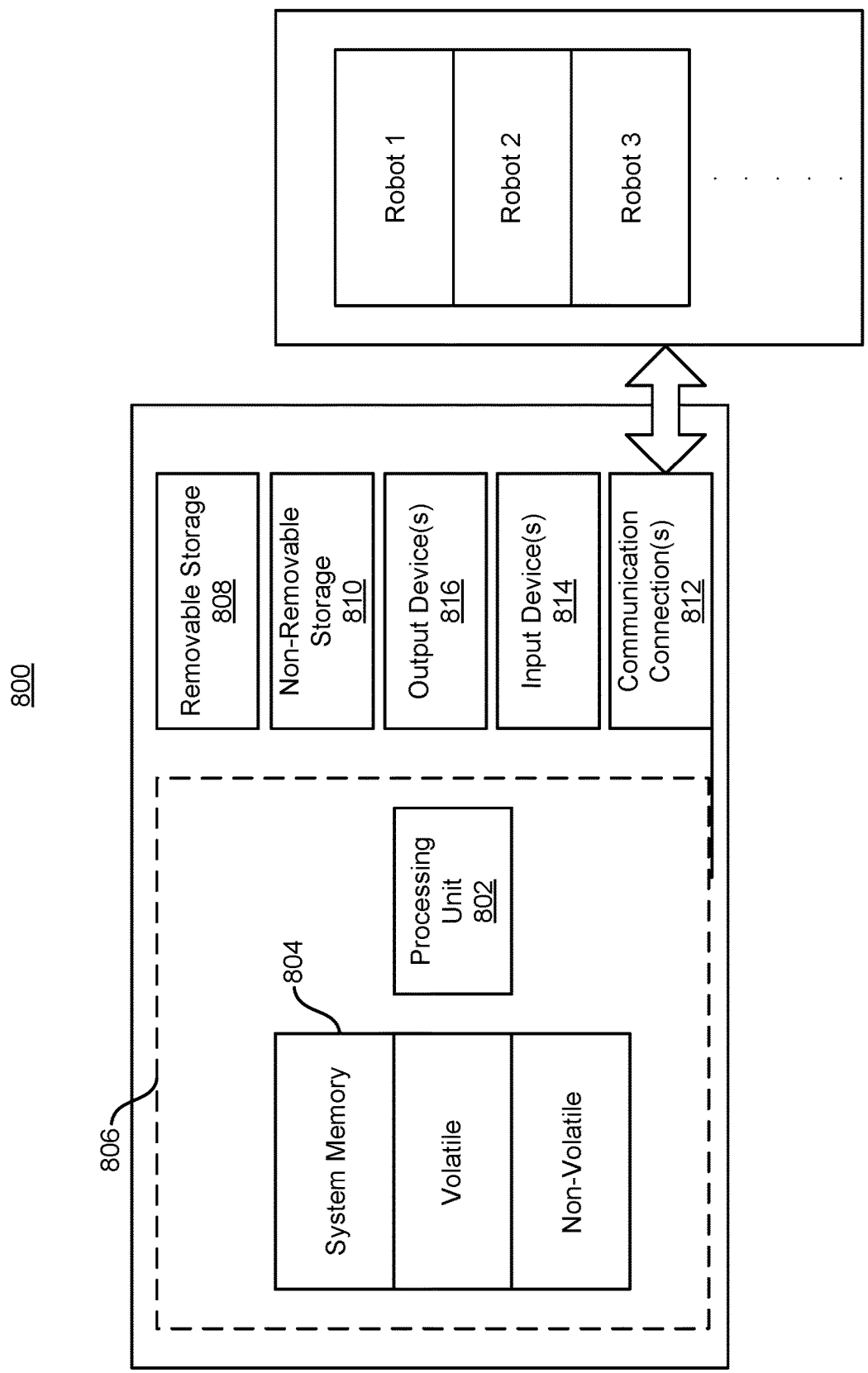
FIG. 8 shows an exemplary computing environment in which example embodiments and aspects may be implemented.

FIG. 8 shows an exemplary computing environment in which example embodiments and aspects may be implemented. The computing device environment is only one example of a suitable computing environment and is not intended to suggest any limitation as to the scope of use or functionality.

Numerous other general purposes or special purpose multi-agent system under wireless network and distributed wireless computing devices environments or configurations may be used. Examples of well-known computing devices, environments, and/or that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, edge computing, fog computing, wireless distributed computing, social learning, federated learning, multi-layer factory layout, clustered robot layout, phantom of mobile robots, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random-access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. The backbone wireless communication connection and the wireless network may be implemented with other infrastructures such as access points or without infrastructures. The communications are thus may be implemented as Machine-to-Infrastructure (M2I), or Machine-to-Machine (M2M), may include other similar patterns such as Device-to-Infrastructure (D2I), Robot-to-Infrastructure (R2I) and Device-to-Device (D2D), Robot-to-Robot (R2R). In protocol wise, commonly adopted IEEE 802 family standards, may include IEEE 802.3 Ethernet, IEEE 802.11 Wireless LAN, IEEE 802.15 Wireless PAN may be used under designated wireless spectrum frequency.

Still further, aspects of the presently disclosed subject matter may be implemented in or across a plurality of processing chips or devices, and storage may similarly be effected across a plurality of devices. Such devices might include personal computers, network servers, and handheld devices, for example.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

What is claimed is:

1. A system comprising:
    a multi-robot system (MRS) comprising a plurality of robots, wherein the MRS is configured to perform a manufacturing task, wherein the plurality of robots comprises a plurality of production robots and a plurality of autonomous mobile robots (AMRs);
    a computing device in electronic communication with the MRS configured to:
    perform a multi-robot task allocation (MRTA) for the MRS, wherein the MRTA is configured to generate task assignments for each of the plurality of production robots and transportation paths for each of the plurality of AMRs,
    adjust the task assignments and transportation paths to assign flows in real-time through iterative execution of a hypergraph search algorithm that is optimized for energy efficiency within the MRS and based at least in part on a hypergraph production robot model corresponding with the MRS, wherein each hyper-vertex of the hypergraph production robot model represents a respective AMR, wherein each directed edge set of the hypergraph production robot model represents a transportation path set with corresponding quantized energy consumption as weights, and wherein the hypergraph search algorithm is configured to: (a) perform biased sampling in favor of higher energy efficiency solutions from an entire solution space, and (b) stop the iterative execution based on marginal distribution bounds estimations determined based on the weights.

2. The system of claim 1, wherein the MRTA is performed in real-time.

3. The system of claim 1, wherein the MRTA is configured to generate real-time decisions regarding tasks for the robots.

4. The system of claim 1, wherein each robot is configured to be involved in a manufacture of multiple products.

5. The system of claim 1, wherein a hypergraph search algorithm is configured to use the hypergraph production robot model to generate the task assignments and the transportation paths.

6. The system of claim 5, wherein the task assignments are optimized to MRS productivity.

7. The system of claim 5, wherein the transportation paths are optimized to control energy consumption.

8. The system of claim 1, wherein the computing device is configured to assign flows in real-time by:
    receiving manufacturing demands for the plurality of robots,
    generating a product plan sequence for each of a plurality of products in distinct orders,
    determining at least one product plan sequence constraint and at least one hypergraph production robot model constraint,
    generating a flow for each product using the at least one product plan sequence constraint and the at least one hypergraph production robot model constraint, and assigning each flow to a respective robot of the plurality of robots as a task.

9. The system of claim 1, wherein the hypergraph search algorithm comprises at least one of a constant time algorithm or a nested hierarchy hypergraph search algorithm.

10. A method comprising:
generating task assignments, using multi-robot task allocation (MRTA), for a plurality of robots of a multi-robot system (MRS) comprising the plurality of robots, wherein the MRS is configured to perform a manufacturing task, wherein the plurality of robots comprises a plurality of production robots and a plurality of autonomous mobile robots (AMRs), wherein the MRTA is configured to:
generate task assignments for the production robots and transportation paths for the AMRs,
adjust the task assignments and transportation paths to assign production flows in real-time through iterative execution of a hypergraph search algorithm that is optimized for energy efficiency within the MRS and based at least in part on a hypergraph production robot model corresponding with the MRS, wherein each hyper-vertex of the hypergraph production robot model represents a respective AMR, and each directed edge set of the hypergraph production robot model represents a transportation path set with corresponding quantized energy consumption as weights, and wherein the hypergraph search algorithm is configured to: (a) perform biased sampling in favor of higher energy efficiency solutions from an entire solution space, and (b) stop the iterative execution based on marginal distribution bounds estimations determined based on the weights.

11. The method of claim 10, further comprising reconfiguring the MRS using the task assignments.

12. The method of claim 10, wherein the MRTA is configured to generate real-time decisions regarding tasks for the robots.

13. The method of claim 10, wherein each robot is configured to be involved in a manufacture of multiple products.

14. The method of claim 10, further comprising adjusting the task assignments and the transportation paths in real-time.

15. The method of claim 10, wherein the task assignments are optimized to MRS productivity.

* * * * *